March 10, 1959  J. A. SENN ET AL  2,876,526
MACHINE TOOL CLAMPING MECHANISM
Original Filed Jan. 15, 1949  2 Sheets-Sheet 1
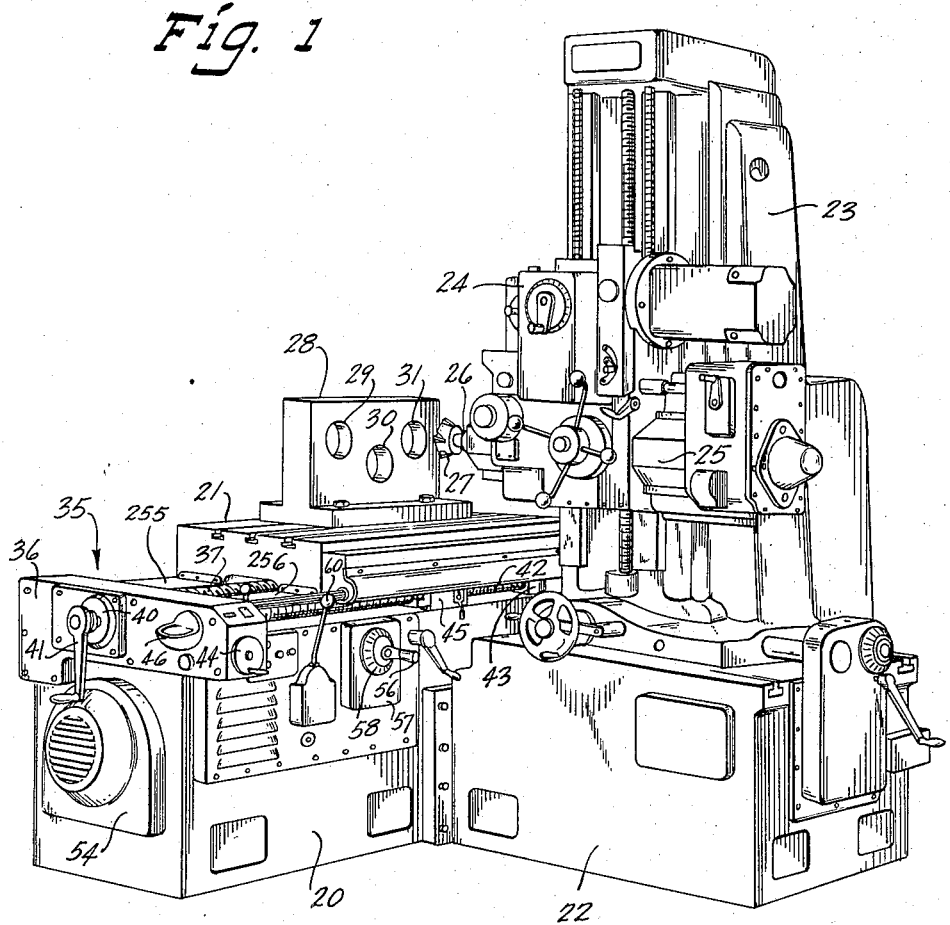
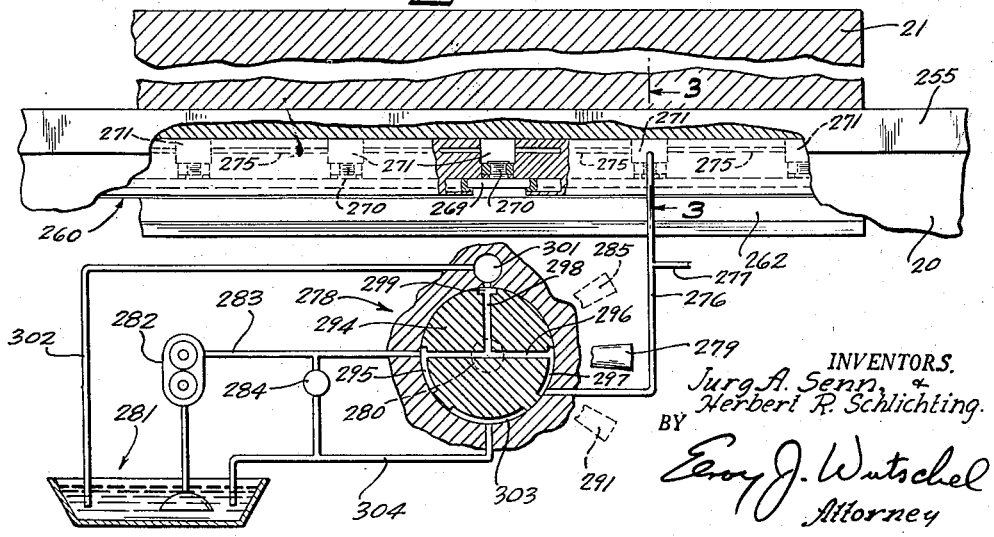
INVENTORS.
Jurg A. Senn &
Herbert R. Schlichting.
BY
Leroy J. Wutschel
Attorney

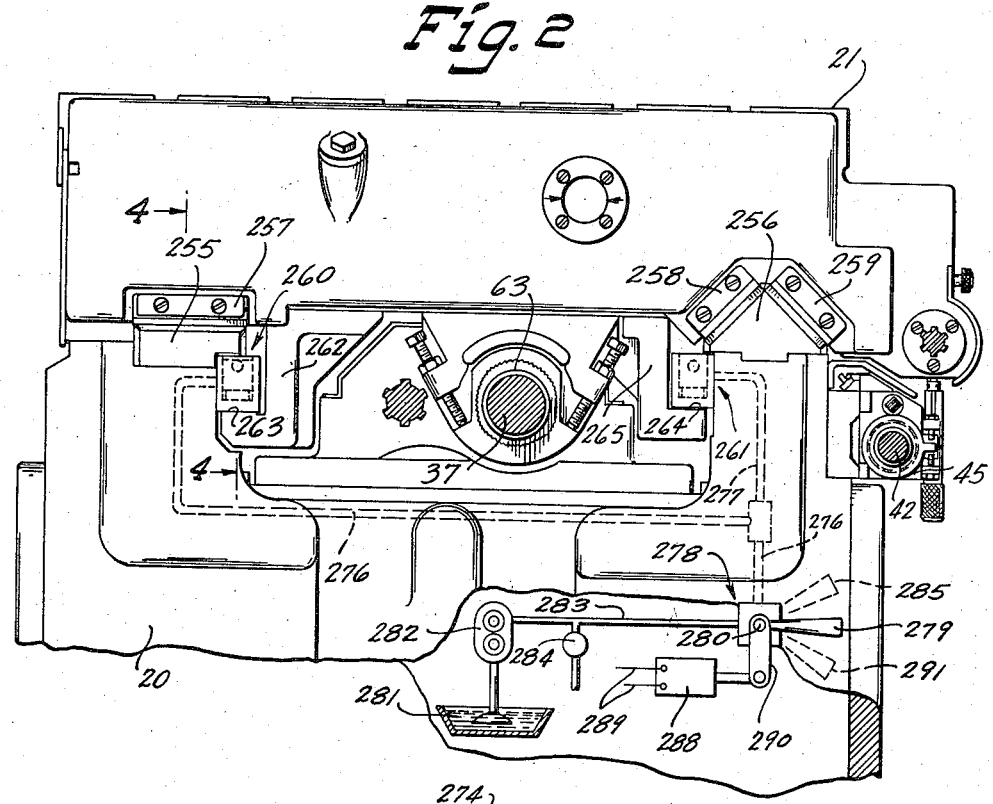
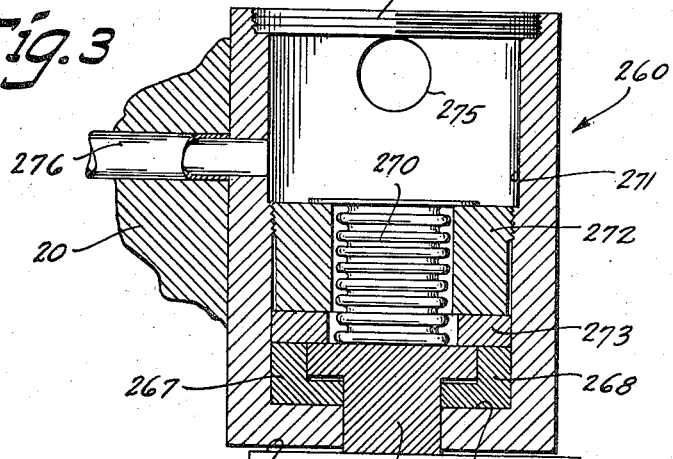

United States Patent Office 2,876,526
Patented Mar. 10, 1959

2,876,526
MACHINE TOOL CLAMPING MECHANISM

Jurg A. Senn and Herbert R. Schlichting, Milwaukee, Wis., assignors to Kearney & Trecker Corporation, West Allis, Wis., a corporation of Wisconsin Original application January 15, 1949, Serial No. 71,082, now Patent No. 2,694,961, dated November 23, 1954. Divided and this application September 10, 1954, Serial No. 469,616

7 Claims. (Cl. 29—1)

This application is a division of an original application of Jurg A. Senn and Herbert R. Schlichting, now U. S. Patent No. 2,694,961, issued November 23, 1954.

This invention relates generally to machine tools and more particularly to mechanism for clamping a movable member of a machine tool in an exact aligned position.

A general object of the invention is to provide an improved clamping mechanism for accurately clamping a movable machine tool member.

Another object of the invention is to provide improved means for mounting a movable member of a machine tool to insure absolute parallel alignment of the movable member with its supporting member.

Another object of the invention is to provide improved means for mounting a movable member of a machine tool to insure absolute transverse alignment of the movable member with an associated cutter carrying member.

Still another object of the invention is to provide improved means for clamping a movable member of a machine tool which is actuated hydraulically and is effective substantially throughout the entire length of the movable member.

Another object of the invention is to provide improved means for applying a clamping force to a movable member of a machine tool, which force is transverse to the plane of travel of the movable member.

Another object of the invention is to provide an improved clamping means automatically functionable during predetermined intervals of a positioning cycle.

According to this invention, an improved clamping mechanism is provided which is especially adaptable to clamp a movable member of a machine tool in a precise predetermined position. The mechanism is shown mounted to accurately clamp a work retaining table member of a milling and boring machine in any exact position to which the table has been positioned. In order to accomplish exact clamping, a pair of clamping mechanisms are longitudinally mounted in the bed structure directly beneath the ways on which the table is slidably supported. The table is provided with a pair of spaced apart depending L-shaped flanges which extend the length of the table. The transverse leg portions of the flanges each have a horizontal contact upper surface disposed to slidably engage a portion of the associated clamping mechanism, regardless of the longitudinal position of the table. When the table has been moved to a desired position, a clamp bar within each of the clamping mechanism is actuated downwardly to engage the respective surface of the transverse portions of the table flanges. Pressure when applied to the clamp bars will bring the bars into full bearing engagement with the contact surfaces on the flanges. Application of pressure to the top of the clamp bars is accomplished by means of a plurality of hydraulically actuated bellows operatively disposed at spaced apart intervals in vertical wells along the entire length of each clamping mechanism. Valve means are employed to selectively control the amount of hydraulic pressure admitted to the wells to control the degree of clamping action exerted by the bars.

The foregoing and other objects of the invention which will become more fully apparent from the following disclosure, may be achieved by means of the particular machine tool clamping mechanism herein described in connection with, and depicted in, the accompanying drawings, in which:

Figure 1 is a general view in perspective of a milling and boring machine with the precision clamping mechanism attached thereto and embodying the various features of the invention disclosed herein;

Fig. 2 is an end elevational view of the bed and table assembly with the positioning mechanism removed to show the table mounting, together with the hydraulic clamping means therefor;

Fig. 3 is an enlarged detailed view in transverse vertical section through one of the hydraulic clamping means contained within the bed and taken generally along the lines 3—3 in Fig. 4; and Fig. 4 is a fragmentary view, partly in longitudinal vertical section and partly schematic of one of the table clamping mechanisms and the control valve therefor and taken generally along the lines 4—4 in Fig. 2.

While the apparatus shown in the drawings and disclosed as an improved type of precision clamping mechanism is a preferred embodiment of the invention, it is to be understood that various features of the invention may be utilized with equal advantages in other types of machine tools and in various other machines.

Referring to the drawings and more particularly to Fig. 1 thereof, the clamping mechanism is shown incorporated into the structure of a milling and boring machine. The application of the mechanism to this type of machine tool structure presented a means of providing a complete disclosure of a practical apparatus embodying the invention. The invention can be just as readily utilized to precisely clamp any other movable member of a machine tool such as the cutter retaining head assembly in the machine tool disclosed herein.

As shown, the machine comprises essentially a hollow bed or base 20 having a work supporting table 21 slidably mounted on the top thereof. The base 20 constitutes the foundation or frame of the machine and provides a housing for the table power drive mechanism and other control units. As shown in Fig. 1, the base 20 is provided with a laterally projecting bed extension 22 adapted to slidably support a spindle head column 23. A spindle head 24 is slidably mounted for vertical movement on the column 23. The spindle head 24 is a self-contained power driven unit including a horizontally movable quill 25 and a rotatably supported cutter driving spindle 26. A cutter 27 retained in the spindle 26 is disposed to operate on a workpiece 28 clamped on the table 21. With this arrangement, the position of the spindle 26 and the cutter 27 may be readily adjusted in either a vertical or horizontal plane in a well known manner. The power rotation of the cutter 27 may be coordinated with the rate of advancement of the quill 25 to provide means for precision threading operations. A detailed description of the construction and operation of the machine tool hereinbefore described is disclosed in Patent No. 2,605,678, issued August 5, 1952, to Joseph B. Armitage and Orrin W. Barker.

In performing a boring or threading operation upon a workpiece, it is often necessary to move the workpiece to one of a plurality of positions relative to the cutter 27. For example, with the workpiece 28 shown in Fig. 1, it is necessary to effect alignment three times in order to accurately position the cutter relative to each of three holes 29, 30 and 31 to be bored therein. The alignment of the holes relative to the cutter in a horizontal plane is accomplished by selectively positioning the table 21 by means of a fully automatic precision positioning mechanism 35, as fully described in U. S. Patent No. 2,694,961, provided to facilitate exact positioning of the table. This arrangement provides means for positioning the table more rapidly and more precisely and is particularly advantageous when a plurality of workpieces must be machined in an identical manner.

The positioning mechanism 35 is conveniently mounted on the upper end of the bed 20 for ready accessibility to the machine operator. A portion of the mechanism is enclosed in a casing 36 attached to the bed 20, as shown in Fig. 1. A table screw 37, journalled in the bed 20 and disposed to effect the manual or power movement of the table 21 along a pair of parallelly disposed way surfaces 255 and 256 in a well known manner, is power driven by means of a motor driven transmission contained within the bed 20. The left end of the table screw 37 is rotatably journalled within the casing 36 and is provided with a dial mechanism 40 on the extending end thereof. The dial mechanism bears the well known indicia which may be read against a zero mark on the casing to indicate the position of the table 21. A crank handle 41 is selectively clutchable to the table screw 37 and serves to provide means for manually effecting movement of the table longitudinally along the ways on the bed 20.

A precision screw 42, as shown in Fig. 1 is parallelly disposed to the table screw 37 and to the path of table travel. The precision screw 42 is journalled in a bracket 43 movably mounted on the bed 20 and is journalled at its other end within the casing 36. The precision screw 42 may be selectively rotated through the manipulation of a hand wheel 44 to effect selective positioning of a precision nut assembly 45. The precision screw 42 is disposed for precise axial movement to operate automatic control mechanism within the casing 36 and to actuate a dial indicator 46 mounted for ease of readability on the side of the casing 36.

The table 21 is power driven from a motor, not shown, operatively mounted within the bed 20 and accessible through a louvered door 54 hinged to the left end of the bed. The motor is connected to drive a fixed step transmission, not shown, unitarily mounted within the bed 20. The operating feed range of the transmission is comparatively broad with the individual feed rates being selectable through the manipulation of a handle 56 operably mounted on a feed rate selector 57. The selected feed rate is determinable by reading a dial 58 in a well known manner. The transmission is connected to drive a table reverser mechanism, not shown. The reverser mechanism is selectively operable to drive the table in either direction and is controlled through the manipulation of a handle 60 conveniently disposed on the side of the bed 20. The direction of handle manipulation in a plane parallel to the bed 20 determines the direction of table travel. As shown in Fig. 1, the handle is disposed in a neutral position with selective movement of the handle to the left serving to institute leftwardly table movement and selective movement of the handle from the neutral position rightwardly serving to institute rightwardly table movement. The handle 60 is connected through linkage mechanism, not shown, to effect axial movement of a clutch gear, constituting a portion of the table reverser mechanism in a well known manner, to provide a power drive to a table drive gear keyed to the table screw 37.

For a detailed description of the transmission and reverser mechanism attention is directed to the aforementioned U. S. Patent No. 2,694,961.

The positioning mechanism 35 may also be readily utilized when effecting the manual manipulation of the hand crank 41. In this case, the workpiece is mounted on the table for a machining operation and the positioning function is made to occur to determine the constant error in the control mechanism as aforedescribed. Thereafter, the position of one of the trip dogs on a drum assembly (not shown) is established to determine the basic reference point of the table 21 and workpiece 28 relative to the center line of the tool retaining spindle 26. Thus, if the precision nut 45 is precisely moved along the precision screw 42 in the same manner as previously described in order to establish a precise distance from the established basic reference point, it is possible to manually manipulate the crank 41 and effect rotation of the table screw 37 until the table 21 is moved the desired distance. The operator need only to observe the reading on the dial indicator 46 and continue table movement until the indicator needle is positioned to read zero, as fully explained in the parent application which issued as Patent No. 2,605,678.

It is to be understood that the aforementioned invention as utilized to automatically control precise positioning of a work retaining table on a milling machine, may also be readily adapted to control other movable machine tool members, such as the tool retaining spindle head 24 slidably mounted on the column 23 in the aforedescribed machine tool. The positioning mechanism 35 could also be utilized to control the precise positioning of movable members on other types of machine tools with equal utility and accuracy.

For insuring that the table 21 will be in absolute parallel alignment with the bed 20 and, also, in absolute transverse alignment with the tool carrying spindle 26, there are provided ways for mounting the table 21 on the bed 20. As shown in Fig. 2, the front side of the table 21 is supported on a flat way 255 fixedly anchored to the bed 20 while the rear of the table 21 is slidably supported on a V-way 256 fixedly mounted on the bed 20. The way surfaces on the underside of the table 21 are precision scraped to insure full surface contact with the ways 255 and 256. A chip wiper 257 attached to the table 21 and disposed to engage the way 255, serves to remove chips therefrom as the table 21 is moved while the chip wipers 258 and 259 attached to the table 21 are disposed to engage the V-way surface 256 and serve in the same capacity thereon. The utilization of the two types of ways 255 and 256 assures absolute parallel alignment of the table 21 with the bed 20 and absolute transverse alignment between the table and the tool retaining spindle.

With this type of table mounting, it is possible to provide for absolute control of the clamping of a movable machine tool member. The use of conventional type of clamping tends to induce a transverse force which serves to effect a slight misalignment of the table whenever the clamping mechanism is operated. Therefore, as shown in Fig. 2, an improved clamping mechanism has been provided with which it is possible to accurately clamp the table member 21 with the clamping forces being induced vertically downward relative to the horizontal plane of table travel. In this manner, the table can be securely clamped to the bed 20 with the assurance than canting or misalignment does not occur.

A pair of clamping mechanisms 260 and 261 are longitudinally mounted in the bed 20 in parallel spaced apart relationship directly beneath the ways 255 and 256, respectively. Toward the front under side of the table 21, there is secured a downwardly depending L shaped flange 262 extending throughout the length of the table and having a horizontal contact surface 263 disposed to slidably engage the bottom face of the clamping mechanism 260. Likewise, the bottom face of the clamping mechanism 261 is disposed to engage a contact surface 264 on a downwardly projecting flange 265 secured to the underside of the table 21 in spaced apart relationship to the flange 262. Thus, the contact surfaces 263 and 264 on the flanges 262 and 265, respectively, are always disposed to engage a portion of the associated clamping mechanisms 260 and 261, respectively, regardless of the longitudinal position of the table 21 on the ways 255 and 256. It should be noted that this structure does not in any way interfere with the operation of the table screw 37 and the nut assembly 63.

Since the operating mechanism within each of the longitudinally extending clamping mechanisms 260 and 261 is identical, only one will be described in detail with specific reference being made to the enlarged detail view shown in Figs. 3 and 4. A longitudinal T-slot 266 machined in the bottom wall of the clamping mechanism 260 is disposed to receive a pair of spaced apart, longitudinally extending retaining bars 267 and 268 which serve to guidably support a T-contact or clamping bar 269 having the stem portion longitudinally disposed and extending downwardly through the slot formed in the bottom wall of the slot 266 on the clamping mechanism 260. Thus, the bottom surface of the longitudinally extending contact or clamping bar 269 will engage the upper contact surface 263 on the L shaped flange 262 integrally secured to the table 21. As viewed in Figs. 2, 3 and 4, the longitudinally extending contact bar 269 is disposed for limited bodily vertical movement throughout its length, and is positively restrained against endwise movement by means of a pair of end plate clamps (not shown). It is obvious that pressure imparted to the contact bar 269 will bring the bar into full bearing engagement with the upper contact surface 263 presented by the depending flange 262, while the release of pressure on the top of the bar 269 will permit the latter to be raised slightly and reduce the degree of pressure engagement with the surface 263 on the flange 262.

The application of pressure to the top of the contact bar 269 is accomplished by means of a plurality of hydraulically actuated metal bellows 270 operatively disposed at spaced intervals in vertical wells 271 along the entire length of the clamping mechanism 260. The bottom of each bellows 270 engages a spaced apart portion of the top surface of the contact bar 269. The top flange of each of the longitudinally spaced bellows 270 is supported on the top edge of a ring nut 272 threadably locked in position within a respective one of the longitudinally spaced wells 271. A packing ring 273 serves to prevent the escape of hydraulic fluid on to the contact bar 269 and the flange 262. The top of each well 271 is enclosed by means of a plug 274 threadably retained in the clamping mechanism 260. A horizontally disposed hydraulic passage 275 conducts hydraulic fluid to each of the wells 271. This serves to equalize the pressure on all of the metal bellows 270 disposed in the plurality of wells throughout the length of the clamping mechanism 260. The amount of pressure imparted to the contact bar 269 increases directly with the pressure of the hydraulic fluid in each of the wells 271. Thus, the table 21 may be fully clamped against all movement relative to the bed 20, as well as only partially released or completely released for longitudinal movement along the ways 255 and 256 presented by the bed 20.

As more fully shown in Fig. 4, it is apparent that the complete clamping mechanism 260 comprises a plurality of longitudinally spaced apart wells 271 that are respectively disposed to engage spaced apart portions of the longitudinally extending clamping bar 269. By means of the hydraulic interconnection 275 between the wells 271, the respective bellows 270 contained therein are disposed to exert a balanced and equalized pressure upon the single longitudinally extending clamping bar 269. It will be readily apparent, therefore, that the lower or contact surface of the bar 269 presents a much greater surface area than the usual circular rods or lugs heretofore employed in clamping devices. Furthermore, the lower contact surface of the contact bar 269 constitutes, in effect, an adjustably positionable way surface, in addition to a clamping device. For example, with a predetermined degree of reduced hydraulic pressure to the spaced apart bellows 270, the contact bar 269, in turn, exerts sufficient vertically downward force against the depending flange 262 to retain the flat table way in snug sliding engagement with the associated flat way 255 of the bed 20. During such a condition of operation, i. e., with the application of predetermined limited pressure, the contact bar 269 functions in the manner of a hydraulically biased gib or adjustable way to preclude any upward movement of the table 21 relative to the bed 20 during a machining operation.

In a similar manner, the spaced apart longitudinally extending clamping mechanism 261 is disposed to cooperate with the upper contact surface 264 of the depending flange 265 secured to the table 21. Thus, the clamping mechanism 261 is adapted to exert either partial pressure or full clamping pressure against the cooperating flange 265, for urging the V-way in the table 21 into either snug sliding or full clamping, engagement with the cooperating bed V-way 256 respectively. In either event, the selected operation of the clamping mechanism 261 is fully coordinated and occurs simultaneously, with a like operation of the clamping mechanism 260. With the application of full pressure to both of the clamping mechanisms 260 and 261, sufficient downward vertical force is exerted upon upwardly facing contact surfaces presented by the depending flanges 262 and 265 to urge the table ways into complete clamping engagement with the respective bed ways 255 and 256. Likewise, with the application of partial pressure to the clamping mechanisms 260 and 261, sufficient pressure is exerted against the flanges 262 and 265 to retain the table ways in snug sliding engagement with the cooperating bed ways and thereby preclude any upward or transverse movement of the table 21 relative to the bed 20, as the table is moved longitudinally along the bed.

To accomplish this result, the clamping mechanism 260 is supplied with hydraulic fluid from a line 276 while the clamping mechanism 261 is supplied from a line 277. Both of the hydraulic lines 276 and 277 are connected to a multiple control valve 278 conventionally disposed toward the back side of the bed 20 adjacent to the controls for the positioning mechanism 35. The control valve 278 is designed to admit hydraulic fluid to actuate the clamping mechanisms for one of three conditions. The valve is manually operable through the manipulation of a control handle 279 pivotally mounted on a pin 280 anchored in the body of the valve. With the handle 279 disposed in the horizontal position shown in Fig. 2, the hydraulic fluid under limited pressure is directed to the clamping mechanisms 260 and 261 and imparts a partial load on the contact bar 269. This load is of sufficient magnitude to retain the table 21 in snug contact with the ways 255 and 256 but not of sufficient magnitude to lock the table against movement.

Hydraulic fluid for the clamping mechanism is obtained from a sump 281 conventionally disposed in the bed of the machine and pumped therefrom by a gear type pump 282, the output of which is directed into the control valve 278 via a line 283. A relief valve 284 in the line 283 serves to limit the maximum pressure of the hydraulic fluid. If the control handle 279 is manipulated to the upper position indicated by the dotted lines 285, the hydraulic flow is completely interrupted by the valve 278 to fully release the contact bars 269 in each of the clamping mechanisms 260 and 261. Generally, the lever is moved to the upper position when the machine tool is to be used for regular machining operations without the utilization of the positioning mechanism 35.

However, when the table 21 is positioned through the operation of the precision positioning mechanism 35, the lever 279 is shifted to the aforedescribed horizontal position whereat the hydraulic clamping mechanisms 260 and 261 serve to impart a partial pressure on each of the contact bars 269 and thus reduce to a minimum any stray movement of the table assembly 21 except for the longitudinal movement imparted through the power drive connected thereto. After the table has been precisely positioned for a given machining operation, a solenoid 288 is automatically energized via wires 289 to actuate linkage mechanism 290 and effectively shift the control lever 279 to the lower position indicated by dotted lines 291 in Fig. 2. With the control handle 279 in this position, hydraulic fluid under full pressure from the pump 282 will be directed to each of the clamping mechanisms 260 and 261. Full pressure is hydraulically imparted to the metal bellows 270 which serve to actuate the bellows and force the entire length of the contact bars 269 downwardly under maximum pressure. The two contact bars 269 will each engage their respective contact surfaces 263 and 264 on the flanges 262 and 265, respectively, with sufficient pressure to lock the table 21 against all movement. The table 21 will remain clamped while the machining operation is performed. The deenergization of the solenoid 288 will serve to release the handle 279 for automatic return to the horizontal position shown in Fig. 2 upon the initiation of a succeeding positioning function under the control of the positioning mechanism 35. When the machine tool is not under the control of the positioning mechanism 35, the solenoid 288 remains unenergized and the control handle may be readily manipulated to either of the three aforementioned positions. Thus, the table may be selectively released, partially loaded under clamping pressure, or fully clamped. It is to be understood that the mounting and clamping means herein disclosed as applicable to a movable work retaining member, may be individually or collectively applied to other movable machine members with equal advantage.

The control valve 278 that is operative upon movement of the control lever 275 to supply one of three degrees of hydraulic pressure to the hydraulic lines 277 and 276 may be of any well known standard type. As an example, the valve 278 is shown diagrammatically in Fig. 4 in which the associated control handle 279 is indicated fragmentarily in one of its operating positions, i. e., for partial pressure as shown in the horizontal position by the solid lines, for no pressure moved upwardly as at 285, and for full clamping pressure moved downwardly as at 291.

For supplying predetermined partial hydraulic pressure to actuate the clamping mechanisms 260 and 261, the control handle 279 is positioned horizontally as indicated by the solid lines in Fig. 4 to rotate the pin 280, and a rotatable circular valve spool 294 secured to the opposite end of the pin, to its central position within the control valve 278. With the rotatable valve spool 294 positioned as indicated, hydraulic fluid under maximum pressure flows from the inlet line 283, through a semi-circular port 295 in the circular valve spool 294, and thence through a diametrically extending drilled line 296, to another semi-circular port 297 connected to the outputt lines 276 and 277. To predeterminately limit output pressure of the hydraulic fluid during this condition of operation, the drilled line 296 is connected via a branch line 298 in the valve spool 294 to an outlet port 299 in the valve and thence to a reduced pressure relief valve 301, that is in turn connected via a bypass line 302 to the sump 281. The reduced pressure relief valve 301 is adjusted to limit hydraulic pressure to a maximum that is considerably less than the pressure provided by the relief valve 284. During this condition of operation, therefore, the maximum reduced or partial pressure available to actuate the clamping mechanisms 260 and 261 is determined by the reduced pressure relief valve 301 and is so arranged as to merely retain the ways of the table in snug engagement with the ways presented by the bed without effecting any clamping action therebetween.

Downward movement of the control handle 279 to its dotted line position 291, effects a rotatable movement of the pin 280 and valve spool 294 in a clockwise direction in a manner that the branch line 298 in the valve spool is moved out of registration with the outlet port 299, thereby precluding flow of fluid to the reduced pressure relief valve 301. During this condition of operation, therefore, hydraulic fluid under maximum pressure flows from the inlet line 283 through the drilled line 296 in the valve spool 294 and thence through the lines 276 and 277 connected to actuate the clamping mechanisms 260 and 261, which operate to movably clamp the table 21 to the bed 20.

In a similar manner, upward movement of the control handle 279 to its dotted line position 285, effects rotation of the valve spool 294 in a counterclockwise direction to effect a corresponding counterclockwise rotation of the valve spool 294. During this condition of operation, the hydraulic fluid in the line 276 is exhausted through a port 303 in the valve spool 294 and thence through an outlet port in the valve 278 through a return line 304 connected to the sump 281. At the same time, the drilled line 296 in the valve spool 294 is moved out of registration with the pressure line 283 to prevent the flow of hydraulic fluid under pressure to the output lines 276 and 277. Thus, upward movement of the control handle to its dotted line position 285 effects a complete release of hydraulic pressure to the clamping mechanisms 260 and 261, to permit complete freedom of movement of the table 21 upon the respective ways 255 and 256 presented by the bed 20. In other words, with the control handle moved upwardly, only the weight of the table 21 retains it in operative slidable engagement with the bed 20.

From the foregoing explanation of the construction of the improved way structure, upon which a movable member of a machine tool is mounted, to provide for absolute parallel and transverse alignment of the member and the improved clamping mechanism for inducing the clamping force transversely to the plane of travel of the movable member and exemplifying the present invention, it will be apparent that there has been provided an improved and novel means for clamping movable machine tool members. The clamping mechanism may be utilized with conventional way construction or used with any other type of way construction. In any case, there is now provided an effective clamping mechanism which eliminates misalignment of the movable member when a clamping force is applied thereto.

Although the illustrative embodiment of the invention has been set forth in considerable detail by way of disclosing an operative mechanism for practicing the invention, it is to be understood that the particular apparatus shown and described is intended to be illustrative only and that various features of the invention may be incorporated in other structural forms without departing. from the spirit and scope of the invention as defined in the subjoined claims.

The principles of the invention having now been fully explained in connection with the foregoing description of illustrative embodying apparatus, the invention is hereby claimed as follows:

1. In a machine tool, a base, a plurality of way surfaces on said base, a movable machine tool member slidably mounted on said way surfaces for longitudinal movement in a horizontal plane, an upwardly facing depending way fixedly secured to the underside of said member, a longitudinally extending clamping means operably disposed in said base in parallelism with said way surfaces and in a manner to overlie the said upwardly facing depending way secured to said member, a hydraulically actuated clamping bar operatively disposed within said clamping means for vertical movement to engage said depending way secured to said movable member, a series of extensible bellows mounted in said clamping means to engage spaced apart portions of the upper surface of said clamping bar, and hydraulic control means selectively operative to apply hydraulic pressure simultaneously to all of said bellows and actuate said clamping bar forcibly downward into engagement with said depending way whereby said movable member may be securely clamped to said base irrespective of its longitudinally adjusted portion therealong.

2. In a clamping mechanism for a movable member of a machine tool, a hollow supporting bed provided with spaced apart parallel ways disposed to slidably support said member, a longitudinally extending depending flange secured to the underside of said member and presenting an upwardly facing contact surface, an elongated clamping mechanism mounted in said machine tool beneath said ways adjacent to said movable member and extending longitudinally of the plane of travel of said movable member and in overlying relationship to the contact surface presented by said depending flange, said clamping mechanism being provided with a longitudinal slot in the bottom surface thereof, said clamping mechanism being provided with a plurality of wells disposed in a longitudinal line and having their lower ends opening into spaced apart portions of the slot formed therein, an elongated clamp bar in said clamping mechanism and being guided for slight vertical movement in the slot formed therein into engagement with the contact surface presented by said depending flange, hydraulically extensible means within each of said wells in contact with spaced apart portions of said clamp bar in a manner to exert a force upon said bar when actuated, a source of fluid pressure, means connecting said source with one of said wells, means interconnecting all of said wells hydraulically in series, and control means operable to control the admission of fluid under pressure from said source to said connected well.

3. In a machine tool, a bed presenting a pair of spaced apart longitudinally extending ways, a worktable slidably mounted on the ways on said bed for longitudinal movement, a depending flange secured to the underside of said bed and presenting an upwardly facing longitudinally extending flat contact surface substantially as long as said worktable, an elongated clamping bar extending longitudinally through said bed and being carried by said bed for a slight bodily vertical movement into a selected degree of pressure engagement with the upwardly facing flat contact surface presented by said flange, a plurality of selectively extensible pressure actuated bellows mounted in said bed in a manner to engage longitudinally spaced apart portions of said clamping bar, a hydraulic circuit including a source of fluid pressure connectable to actuate all of said bellows for exerting a predetermined degree of downward pressure on said clamping bar, and a control system interconnected in said hydraulic circuit connected to selectively vary the degree of pressure on said bellows to predeterminately vary the degree of pressure exerted by said clamping bar upon the upwardly facing contact surface presented by said flange whereby said worktable is retained in snug guiding engagement with said bed ways or is immovably clamped to said bed ways.

4. In a machine tool, a bed presenting a pair of spaced apart horizontally positioned way surfaces, a worktable slidably carried by the way surfaces on said bed for horizontal movement, a pair of downwardly extending flanges secured to the underside of said table in spaced apart relationship and presenting upwardly facing contact surfaces substantially as long as said worktable, a pair of longitudinally extending clamp bars carried for a slight bodily vertical movement by said bed in a manner to engage the upper contact surfaces presented by said flanges, a plurality of selectively extensible pressure actuated devices respectively disposed to operatively engage spaced apart portions of said clamp bars at a plurality of spaced points along their lengths, an hydraulic circuit including a source of fluid pressure connectable to actuate said devices, and a control valve operatively interconnected in said circuit being operative to selectively connect said circuit for supplying pressure to effect extensible movement of said devices and thereby urge said clamping bars into forcible engagement with the contact surfaces on said flanges whereby said worktable is urged downward into immovable clamping engagement with the way surfaces presented by said bed.

5. In a machine tool, a bed provided with a pair of spaced apart way surfaces, a table slidably guided by the way surfaces presented by said bed for longitudinal movement in a horizontal plane, a downwardly depending flange secured to the underside of said table and being provided with an upwardly facing horizontal contact surface substantially as long as said table and in parallelism with said bed ways, a longitudinally extending bar disposed in parallelism with said bed ways and presenting on its underside a contact surface engageable with the contact surface presented by said flange, said longitudinal bar being mounted in said bed for a slight bodily vertical movement relative to said flange, a plurality of pressure actuated devices carried in longitudinally spaced relationship in said bed in a manner to engage spaced apart portions of the upper surface of said bar, said pressure actuated devices being operatively arranged to selectively exert a balanced equalized pressure for urging said bar downward into clamping engagement with the contact surface presented by said flange, and a hydraulic circuit including control means operatively connected to selectively actuate said devices in a manner to exert a predetermined partial pressure on said bar in a manner to retain said table in snug guiding engagement with said bed way surfaces with sufficient force to resist transverse or upward forces against said table during longitudinal movement.

6. In a machine tool, a frame presenting a pair of spaced apart horizontal way surfaces, a worktable slidably carried by the horizontal way surfaces on said bed for longitudinal movement in a horizontal plane, a pair of spaced apart depending flanges secured to the underside of said worktable and extending throughout the length thereof, said flanges presenting upwardly facing longitudinally extending contact surfaces, a pair of vertically movable clamping devices presenting on their underside contact surfaces respectively disposed to engage the contact surfaces presented by said flanges, said clamping devices being carried by said bed for a limited vertical movement, hydraulic means connected to simultaneously urge said clamping devices vertically downward into predetermined limited pressure engagement with the contact surfaces presented by said flanges for urging said worktable into snug guiding engagement with the horizontal way surfaces presented by said bed whereby said worktable is forcibly restrained against lateral or upward movement during longitudinal movement along said bed.

7. In a clamping mechanism for a movable member of a machine tool slidably mounted on guideways formed on a base, an upwardly facing depending way secured to the movable member in downwardly spaced relationship to the underside of the movable member, an elongated clamping mechanism body member mounted in the base below the guideways and extending longitudinally relative to the movable member, said body member being provided with a plurality of wells having their longitudinal axis in a plane transverse to the plane of travel of the movable member, said clamping mechanism body member being provided on its underside with a longitudinal slot that is open into the respective wells provided therein and is in registration with said depending way, hydraulic circuit means interconnecting said wells, a vertically movable clamp bar guided for vertical movement within the slot formed in said clamping mechanism body member, said clamp bar being disposed to engage with its underside said upwardly facing depending way secured to the movable member, a metallic bellows fixed within each of said wells in position to exert with its lower end a downward force upon said clamp bar when actuated, and means to introduce fluid pressure through said hydraulic circuit means into said wells to actuate said bellows, whereby said bellows urge said bar downwardly into clamping engagement with said depending way secured to said movable member.

References Cited in the file of this patent

UNITED STATES PATENTS

| | | |
|---|---|---|
| 1,285,628 | Craley | Nov. 26, 1918 |
| 2,049,842 | Kling | Aug. 4, 1936 |
| 2,355,677 | Ransome | Aug. 15, 1944 |
| 2,452,804 | Sulprizio | Nov. 2, 1948 |
| 2,477,490 | Martin | July 26, 1949 |
| 2,483,810 | Cotta | Oct. 4, 1949 |
| 2,584,770 | Wilcock | Feb. 5, 1952 |

FOREIGN PATENTS

| | | |
|---|---|---|
| 244,288 | Great Britain | Dec. 17, 1925 |